United States Patent
Ichihashi (10) Patent No.: US 8,908,229 B2
(45) Date of Patent: Dec. 9, 2014

(54) IMAGE PROCESSING APPARATUS AND METHOD CONFIGURED TO UPDATE GAMMA CORRECTION TABLE FOR DIFFERENT PAPER TYPES

(71) Applicant: Canon Kabushiki Kaisha, Tokyo (JP)

(72) Inventor: Yukichika Ichihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/711,503

(22) Filed: Dec. 11, 2012

(65) Prior Publication Data

US 2013/0155427 A1 Jun. 20, 2013

(30) Foreign Application Priority Data

Dec. 15, 2011 (JP) ................. 2011-274887

(51) Int. Cl.
H04N 1/60 (2006.01)
(52) U.S. Cl.
CPC ............... *H04N 1/60* (2013.01); *H04N 1/6033* (2013.01); *H04N 1/6097* (2013.01)
USPC ............... 358/1.9; 358/504; 358/518
(58) Field of Classification Search
None
See application file for complete search history.

(56) References Cited

U.S. PATENT DOCUMENTS

| | | | |
|---|---|---|---|
| 6,418,281 B1 * | 7/2002 | Ohki | 399/49 |
| 6,898,381 B2 * | 5/2005 | Maebashi et al. | 399/15 |
| 6,985,678 B2 * | 1/2006 | Maebashi et al. | 399/39 |
| 7,035,559 B2 * | 4/2006 | Tanaka et al. | 399/49 |
| 7,969,624 B2 * | 6/2011 | Mestha et al. | 358/504 |
| 8,400,677 B2 * | 3/2013 | Sakamoto et al. | 358/1.9 |
| 2005/0117926 A1 * | 6/2005 | Tanaka et al. | 399/49 |
| 2011/0116118 A1 * | 5/2011 | Nakase | 358/1.13 |
| 2011/0242609 A1 * | 10/2011 | Oki | 358/3.03 |
| 2012/0327476 A1 * | 12/2012 | Campbell et al. | 358/3.01 |

FOREIGN PATENT DOCUMENTS

JP 2011-107374 A 6/2011

* cited by examiner

*Primary Examiner* — Dung Tran (74) *Attorney, Agent, or Firm* — Canon U.S.A., Inc. IP Division

(57) ABSTRACT

An image processing apparatus includes an obtaining unit configured to obtain a gamma correction table used for image formation on non-reference paper using a correlation between a characteristic of reference paper and a characteristic of the non-reference paper and a gamma correction table obtained through calibration using the reference paper, a first reading unit configured to form a pattern on plain paper and read the formed pattern, a second reading unit configured to form a pattern on an image bearing member and read the formed pattern, a comparison unit configured to compare a value read by the first reading unit with a value ready by the second reading unit, and a correction unit configured to correct the characteristic indicating the correlation used for obtaining the gamma correction table for the non-reference paper by the obtaining unit when a difference of values compared by the comparison unit exceeds a first threshold.

9 Claims, 12 Drawing Sheets

IMAGE PROCESSING APPARATUS AND METHOD CONFIGURED TO UPDATE GAMMA CORRECTION TABLE FOR DIFFERENT PAPER TYPES

BACKGROUND OF THE INVENTION

1. Field of the Invention

The present invention relates to a unit for calibrating an output image in image formation applied to an image processing apparatus such as a printer and a copying machine for performing image processing using an electrophotographic method.

2. Description of the Related Art

In an image processing apparatus such as a copying machine and a printer apparatus, a technique for calibrating an output image is conventionally employed. This technique corrects a gamma value provided from an image printed on a sheet of paper having a certain characteristic. Specifically, a gradation pattern is first printed on a specific type of paper at the time of execution of calibration. Then, the printed pattern is read by a reading device, and a result of the reading is used to calculate a gamma correction table. According to the related-art technique, therefore, when the specific type of paper used at the time of execution of calibration is used for printing, calibration can be executed. However, when other types of paper are used for printing, calibration cannot be executed.

Since there are many types of printing paper each of which has a different transferability (an ability to absorb toner into paper by charging) and fixability (an ability to fix toner to paper by heat and pressure), the calibration cannot be executed on the other types of paper. That is, when paper having a different characteristic is used, an output image differs in density. Thus, calibration needs to be executed using paper having the same characteristic as paper to be actually used for image printing. Otherwise, correct calibration cannot be performed. Japanese Patent Application Laid-Open No. 2011-107374 discusses a technique for solving such an issue.

This technique, for example, previously acquires and stores, in the apparatus, a correlation between a certain characteristic (hereinafter referred to as a first characteristic) of reference paper and a characteristic of non-reference paper. The reference paper is used for calibration, and the non-reference paper has a second characteristic different from the first characteristic.

For example, the reference paper having the first characteristic is to be plain paper serving as recommended paper for calibration, and the non-reference paper having the second characteristic is to be thick paper.

According to such a technique, when calibration using the reference paper is executed, a gamma correction table to be used when printing is performed on the non-reference paper can be obtained based on a gamma correction table generated by the calibration and the paper characteristic correlation.

Therefore, whenever calibration is executed using the reference paper, the gamma correction table is automatically updated using the paper characteristic correlation without executing calibration using the non-reference paper.

The execution of the related-art technique requires reference paper of which a sheet characteristic is well defined. However, an operation unit of the apparatus for performing calibration displays characteristics roughly classified by paper type on a display unit for the sake of user convenience when a paper type indicating a type of paper is displayed on the display unit. Accordingly, the detailed characteristic of the reference paper cannot be displayed, and the characteristic of the paper to be used for printing is displayed on a roughly-classified paper type basis on the display unit.

For example, paper having a grammage of approximately 65 g/m² to 90 g/m² is classified as plain paper. That is, paper (reference paper) having a first characteristic with a grammage of 81 g/m² and paper having a third characteristic with a grammage of 68 g/m² are classified as plain paper of the same paper type.

Thus, although each paper actually has a different characteristic, both of the paper are classified as plain paper. Consequently, a user has difficulty in determining whether a characteristic of paper to be used for calibration is the same as that of the reference paper (the first characteristic).

If paper used by the user as the reference paper is the third paper, a gamma correction table, different from that obtained when calibration is performed using the first paper, is obtained.

In such a case, a value serving as a reference differs, causing inaccuracy of the characteristic correlation between the reference paper and the non-reference paper. Consequently, for example, a gamma correction table for non-reference paper such as thick paper becomes inaccurate.

SUMMARY OF THE INVENTION

The present invention is directed to an image processing apparatus capable of appropriately correcting, even when a plurality of types of paper having different characteristics is classified as the same plain paper, and calibration is performed using plain paper having a characteristic different from that of reference paper, a gamma correction table for paper classified as a different type of paper.

According to an aspect of the present invention, an image processing apparatus includes an obtaining unit configured to obtain a gamma correction table to be used at the time of image formation on non-reference paper by using a correlation between a characteristic of reference paper and a characteristic of the non-reference paper and a gamma correction table obtained by executing calibration using the reference paper, a first reading unit configured to form a pattern on plain paper and to read the formed pattern, a second reading unit configured to form a pattern on an image bearing member and to read the formed pattern, a comparison unit configured to compare a value read by the first reading unit with a value read by the second reading unit, and a correction unit configured to correct the characteristic indicating the correlation to be used at the time of obtaining the gamma correction table for the non-reference paper by the obtaining unit when a difference of the values compared by the comparison unit exceeds a first threshold.

According to an exemplary embodiment of the present invention, even when calibration is executed using the plain paper other than the reference paper, a gamma correction table to be used at the time of printing on paper classified as a type different from that of the plain paper can be appropriately corrected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
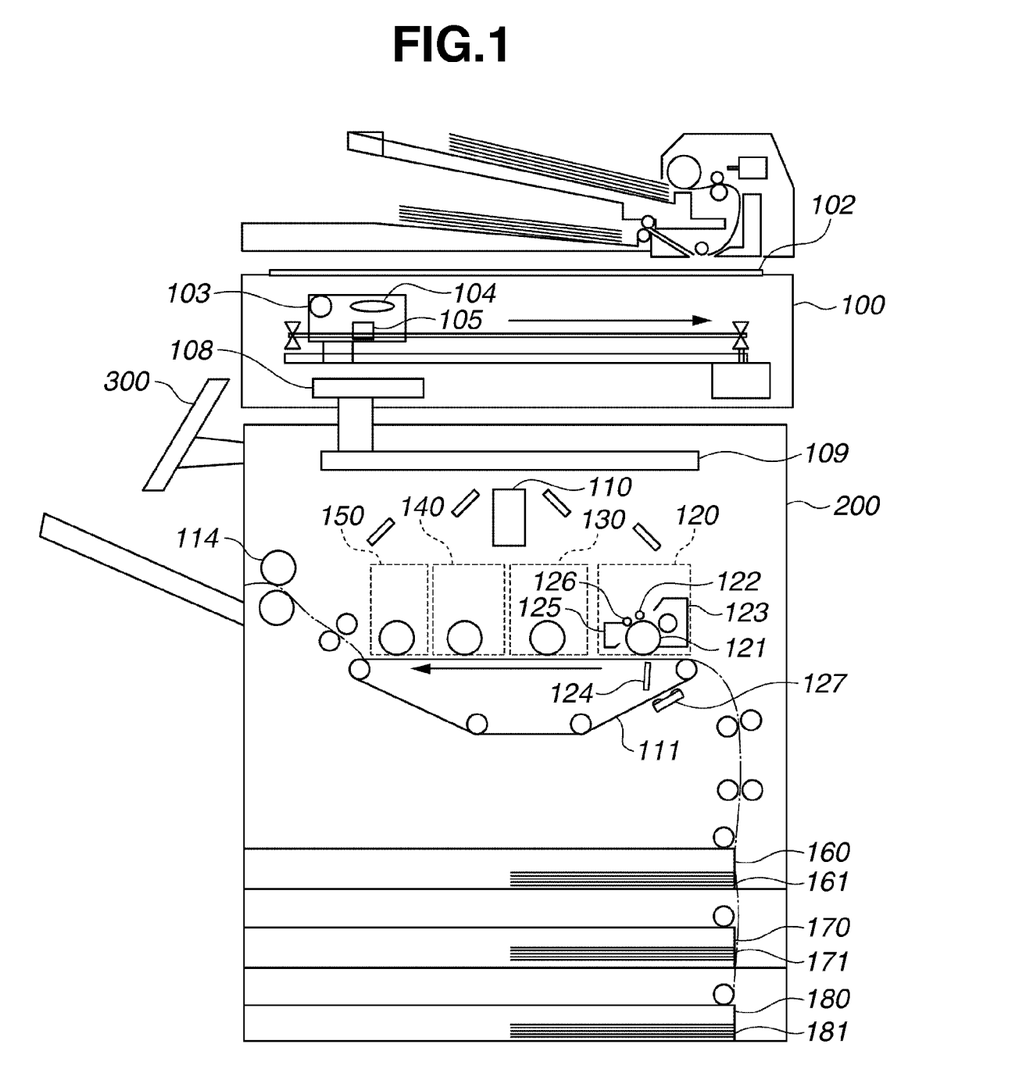
FIG. 1 is a cross-sectional schematic view illustrating a configuration example of an image forming apparatus according to a first exemplary embodiment of the present invention.

FIG. 1 is a cross-sectional schematic view illustrating a configuration example of an image processing apparatus according to a first exemplary embodiment of the present invention.

In the present exemplary embodiment, an electrophotographic color copying machine having a plurality of drums is described as an example of the image processing apparatus. However, the present exemplary embodiment is not limited thereto. The present exemplary embodiment may be applied to electrophotographic copying machines using various methods, a mono-color printer, and a non-electrophotographic image processing apparatus.

A document placed on a document positioning glass plate 102 of a reader unit 100 is irradiated with light by a light source 103, and is imaged on a charge coupled device (CCD) sensor 105 via an optical system 104. Such a reading optical unit scans the document in a direction indicated by an arrow illustrated in FIG. 1, thereby converting the document into an electric signal data string per line.

A reader image processing unit 108 converts the electric signal data string obtained by the CCD sensor 105 into image data, and performs image processing on the image data. Subsequently, the image data is provided to a printer 200, and undergoes image processing in a printer control unit 109.

The printer control unit 109 converts the image data into a pulse-width modulation (PWM) laser beam.

A polygonal scanner 110 scans and irradiates photosensitive drums 121, 131, 141, and 151 of respective image forming units 120, 130, 140, and 150 with the laser beams.

Simultaneously with such operations, a sheet of paper is fed from first paper 161 stacked in a first sheet cassette 160, second paper 171 stacked in a second sheet cassette 170, or third paper 181 stacked in a third sheet cassette 181. The sheet is then placed on a transfer belt 111, and passes under the image forming units 120, 130, 140, and 150.

The image forming units 120, 130, 140, and 150 are image forming units for yellow (Y), magenta (M), cyan (C), and black (K), respectively.

The image forming units 120, 130, 140, and 150 form images of respective colors. Since the image forming units 120, 130, 140, and 150 are substantially similar to one another, the yellow image forming unit 120 is described in detail while descriptions of the other image forming units 130, 140 and 150 are omitted.

The yellow image forming unit 120 includes a photosensitive drum 121, a primary charging unit 122, a developing unit 123, and a transfer blade 124. The photosensitive drum 121 forms an electrostatic latent image on a surface thereof by the laser beam from the polygonal scanner 110. The primary charging unit 122 charges a surface of the photosensitive drum 121 with a predetermined potential to prepare for electrostatic latent image formation. The developing unit 123 develops the electrostatic latent image on the photosensitive drum 121, thereby forming a toner image. The transfer blade 124 discharges electricity from a back surface of the transfer belt 111 serving as an image bearing member, so that the toner image on the photosensitive drum 121 is transferred to a sheet on the transfer belt 111.

Upon transfer of the toner image, the surface of the photosensitive drum 121 is cleaned by a cleaner 125 and electrically discharged by an auxiliary charging unit 126 such that the primary charging unit 122 can again charge the surface of the primary charging unit 122 in a good manner.

Moreover, the sheet with the transferred yellow image is conveyed to the image forming units 130, 140, and 150 in this order by the transfer belt 111. Accordingly, toner images of respective colors formed by the image forming units 120, 130, 140, and 150 are sequentially transferred, thereby forming a four-color image on a surface of the sheet. The sheet is separated from the transfer belt 111 upon passing the black image forming unit 150. When the sheet is separated, the transfer belt 111 undergoes preparation to absorb a sheet again. The toner image on the sheet separated from the transfer belt 111 is fixed in a fixing device 114.

Figure 2:
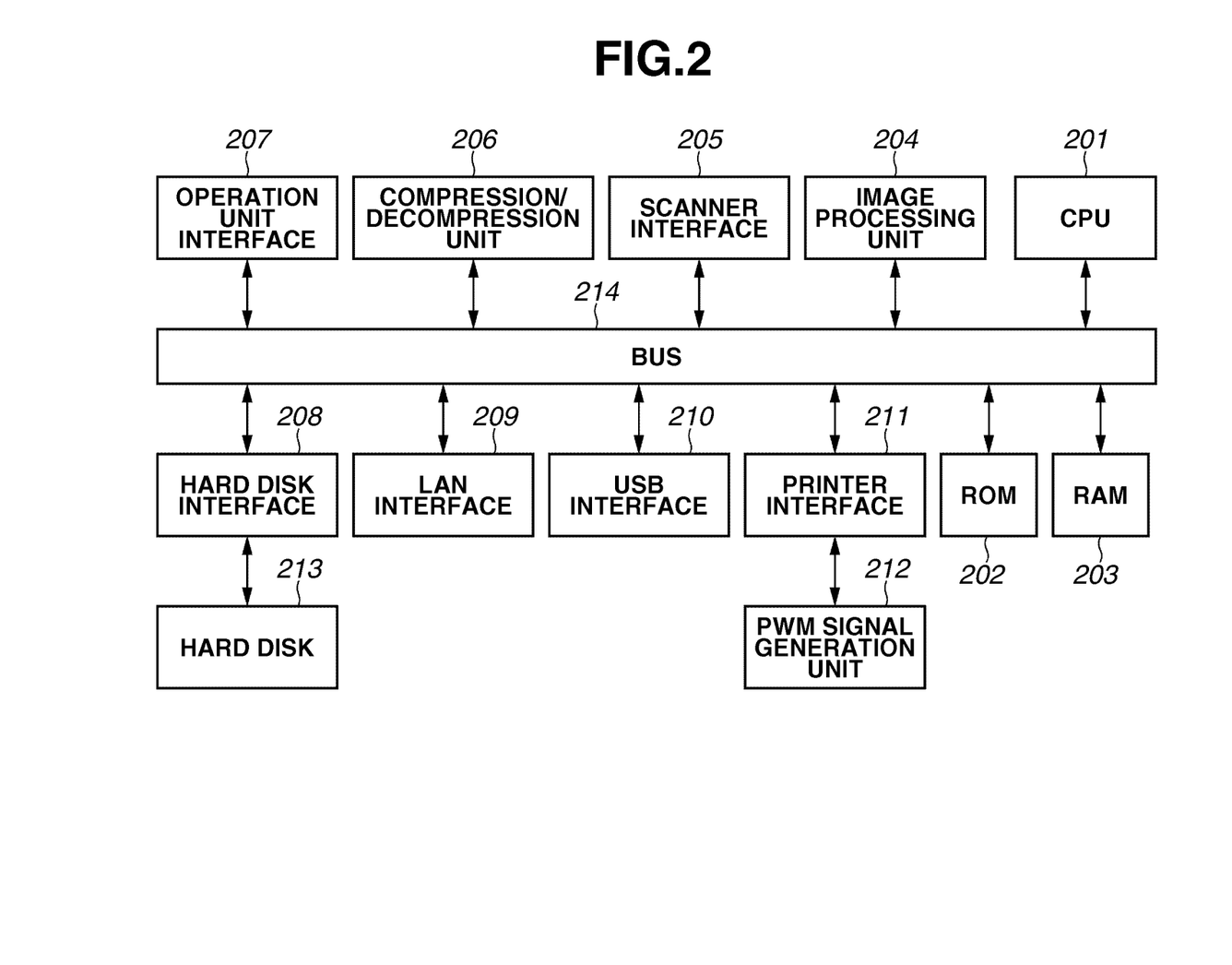
FIG. 2 is a block diagram illustrating a printer control unit.

The printer control unit 109 controls the entire operation of a color copying machine in the present exemplary embodiment. FIG. 2 is a block diagram illustrating the printer control unit 109.

The printer control unit 109 includes a central processing unit (CPU) 201, a read only memory (ROM) 202, and a random access memory (RAM) 203. The CPU 201 controls each unit and executes calculation according to a program stored in the ROM 202. The printer control unit 109 uses a data bus 214 for transferring various data including image data, and the random access memory 203 as a temporary storage.

An image processing unit 204 obtains image data from a scanner interface 205 connected to the reader image processing unit 108, and uses the image data for image processing.

An operation unit interface 207 transfers an external operation, which is set in an operation unit 300, to the CPU 201.

Figure 3:
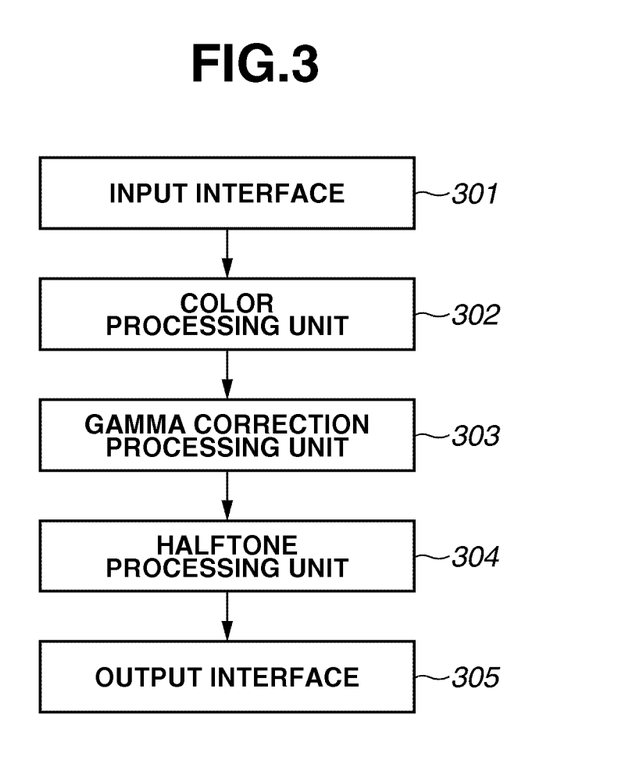
FIG. 3 is a block diagram illustrating an image processing unit.

FIG. 3 is a block diagram illustrating the image processing unit 204 in detail. When an input interface 301 receives image data, a color processing unit 302 executes color conversion of the image data according to a purpose of image formation. For example, when a copy image is formed, image data of red, green, and blue (RGB) is normally input. However, since the printer 200 employs a color printing method with CMYK, the three-color RGB image is converted into a four-color CMYK image. A color conversion method includes conversions using matrix calculation and a three-dimensional look up table (LUT). However, the present exemplary embodiment is not limited thereto.

Subsequently, a gamma correction processing unit 303 executes a gamma correction. The gamma correction adjusts a halftone density characteristic provided by halftone processing by the printer 200 to a target density characteristic.

Accordingly, one-dimensional gradation conversion is executed with respect to each of CMYK using an LUT. The LUT is updated when calibration is executed. A plurality of LUTs is stored in the RAM 203. Moreover, a content of the LUT can be selectively rewritten or replaced according to an instruction from the CPU 201.

Since the printer 200 has a print gradation of bi-level, a halftone processing unit 304 converts the print gradation into a multi-level pseudo-halftone gradation obtained by gamma correction processing. Herein, an error diffusion method or a dither method can be employed as a conversion method. However, the present exemplary embodiment is not limited to these methods.

An output interface 305 transfers a halftone image having undergone a process in the image processing unit 204 to outside of the image processing unit 204.

First, in a normal operation, a paper type of each of the first paper 161 for the first cassette 160, the second paper 171 for the second cassette 171, and the third paper 181 for the third cassette 180 is set as an initial setting. This setting is described with reference to the flowchart illustrated in FIG. 5.

Figure 4:
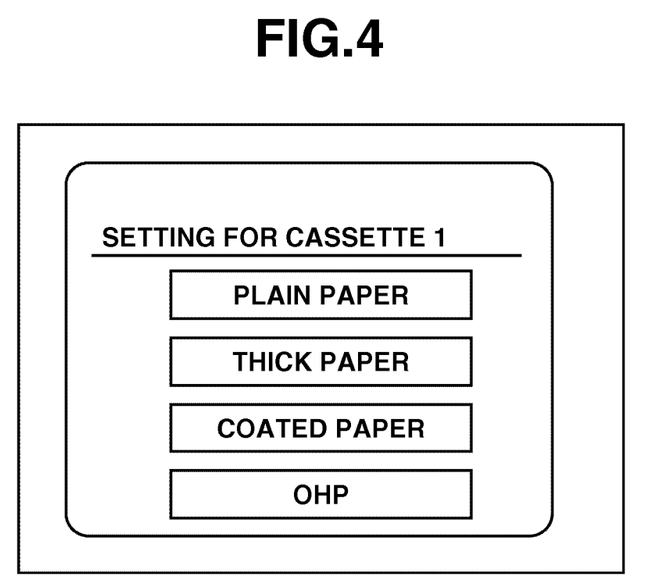
FIG. 4 is a diagram illustrating an example screen of an operation unit when a paper type of a cassette is selected.
Figure 5:
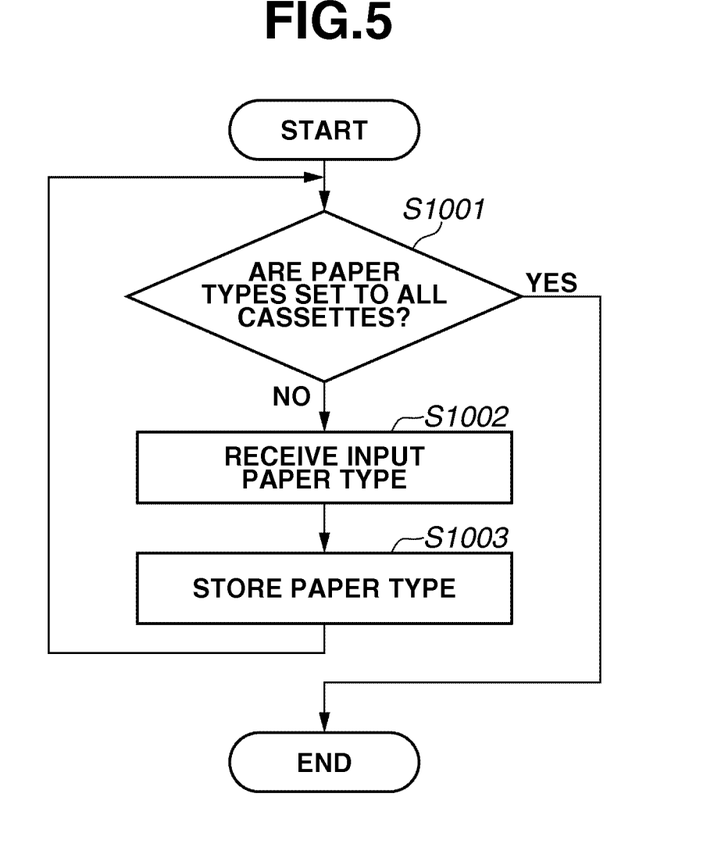
FIG. 5 is a flowchart illustrating processing performed when a paper type for a cassette is selected.

In step S1001, the CPU 201 determines whether paper types are set to all cassettes. If the paper types are not set to all cassettes (NO in step S1001), the CPU 201 facilitates a setting from the operation unit 300 regarding a cassette to which a paper type is not set. Herein, the operation unit 300 displays, for example, a screen as illustrated in FIG. 4.

In this case, assume that a paper type is selected from plain paper, thick paper, coated paper, and overhead projector (OHP) paper. Herein, paper set as the plain paper is a type of paper recommended by the copying machine used in the present exemplary embodiment. For example, a characteristic of the plain paper indicates that the paper has a grammage of approximately 65 g/m$^2$ to 90 g/m$^2$. Moreover, a characteristic of paper set as the thick paper indicates that the paper is heavy, having a grammage of 90 g/m$^2$ or more, for example. A characteristic of paper set as the coated paper indicates that the paper has high quality with a coated surface. The paper types are not limited thereto. For example, color paper and special paper can be set.

In step S1002, the operation unit 300 receives an input of the paper type upon selection, and notifies the CPU 201 of the paper type. Subsequently, in step S1003, the CPU 201 stores the paper type of each cassette in the RAM 203.

Figure 6:
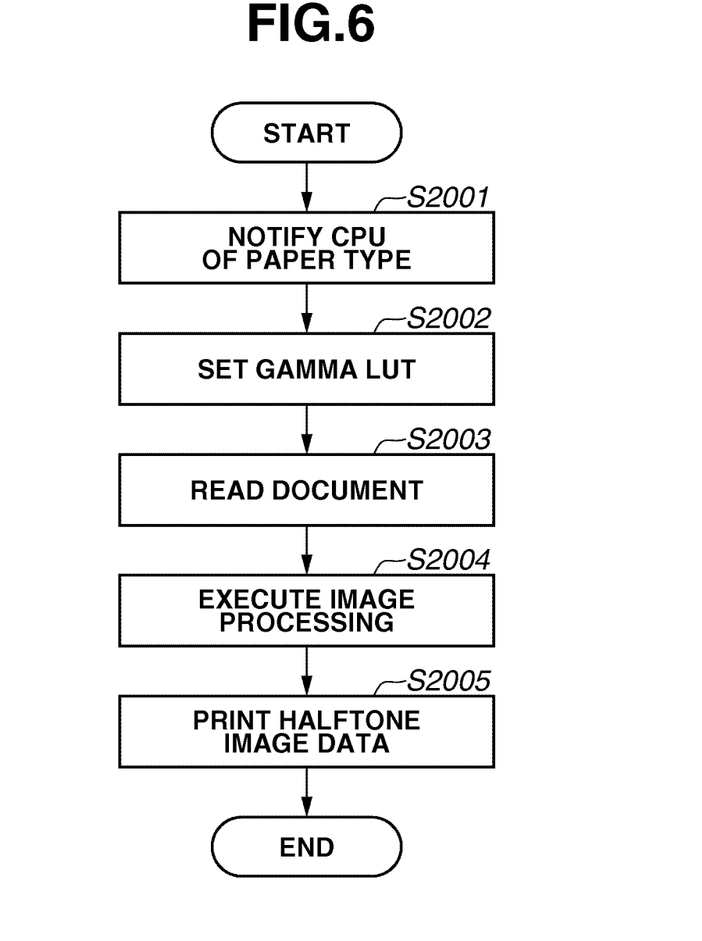
FIG. 6 is a flowchart illustrating processing at the time of normal operation.

Next, processing performed at the time of a copy operation by the copying machines is described with reference to a flowchart illustrated in FIG. 6.

In step S2001, the operation unit 300 notifies the CPU 201 of a designated paper type.

In step S2002, the CPU 201 reads a gamma correction table for the designated paper based on the notified paper type, the gamma correction table being stored in the RAM 203. The CPU 201 sets this gamma correction table in the gamma correction processing unit 303 of the image processing unit 204. The gamma correction table is generated by calibration described below.

In step S2003, the reader unit 100 reads a document placed on the document positioning glass plate 102 as image data, and transfers the RGB image data to the image processing unit 204.

In step S2004, the image processing unit 204 executes image processing. First, the color processing unit 302 converts RGB continuous tone image data into CMYK continuous tone image data. Then, the gamma correction processing unit 303 executes the gamma correction using the LUT set according to the paper type. Subsequently, the halftone processing unit 304 converts the CMYK continuous tone image data into CMYK halftone image data. The CMYK halftone image data is stored in the RAM 203 through the output interface 305.

In step S2005, the printer 200 prints the CMYK halftone image data.

Herein, the CMYK halftone image data of the RAM 203 is converted into a PWM signal by a PWM signal generation unit 212, and an image thereof is formed through the polygonal scanner 110.

In addition to such a copy operation, for example, any of page description language (PDL) data input from a local area network (LAN) interface 209, Joint Photographic Experts Group (JPEG) data input from a universal serial bus (USB) interface, and compressed data input from a hard disk 208 can be converted into CMYK continuous tone image data and undergo the processing after S2004, so that image formation can be executed. Moreover, gamma correction is executed using a gamma correction table generated for each paper type regardless of a type of an input interface.

Figure 7:
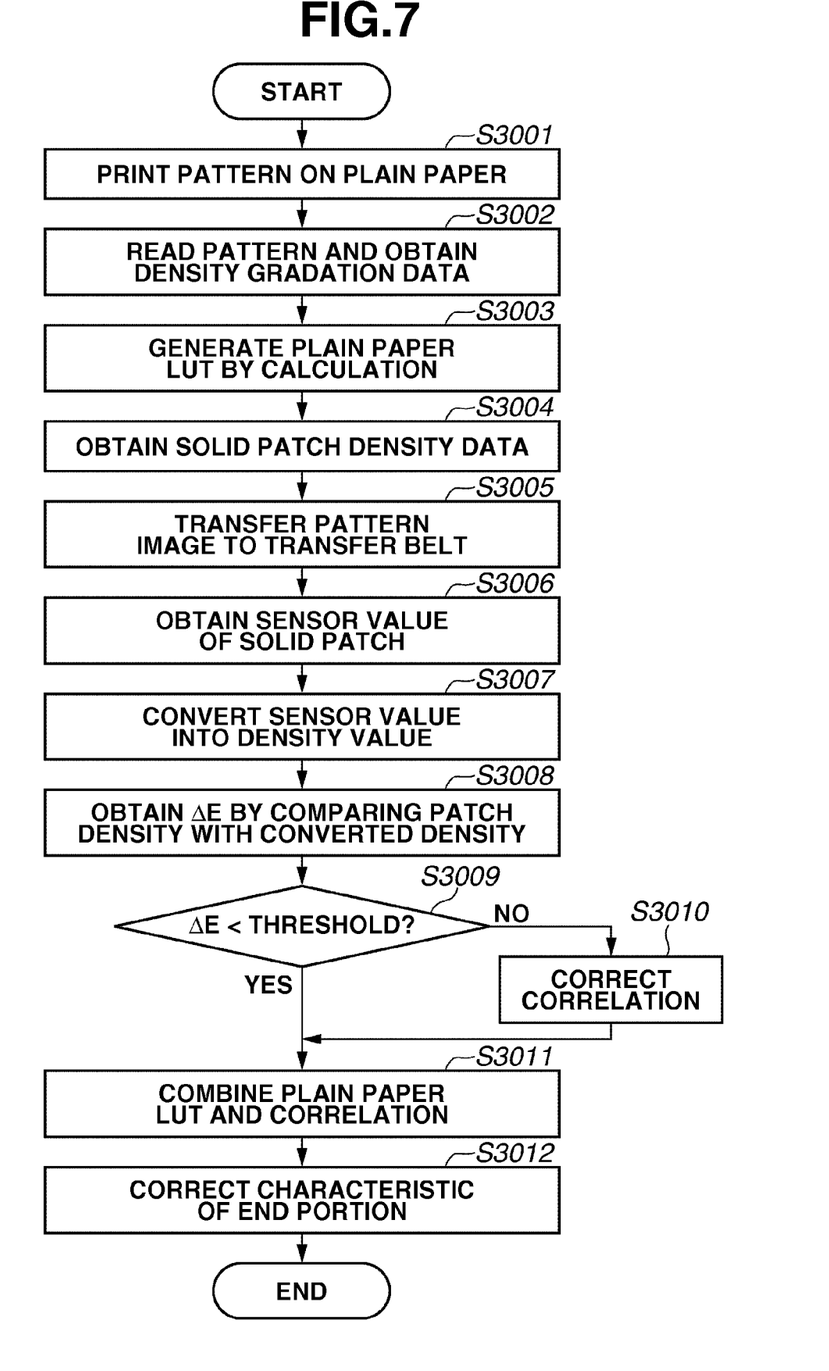
FIG. 7 is a flowchart illustrating processing at the time of execution of calibration.

FIG. 7 is a flowchart illustrating an operation at the time of execution of calibration according to the present exemplary embodiment.

Upon receipt of a calibration execution input, the operation unit 300 transmits the input of calibration execution to the CPU 201. Then, the CPU 201 executes calibration according to the flowchart illustrated in FIG. 7.

Figure 8A:
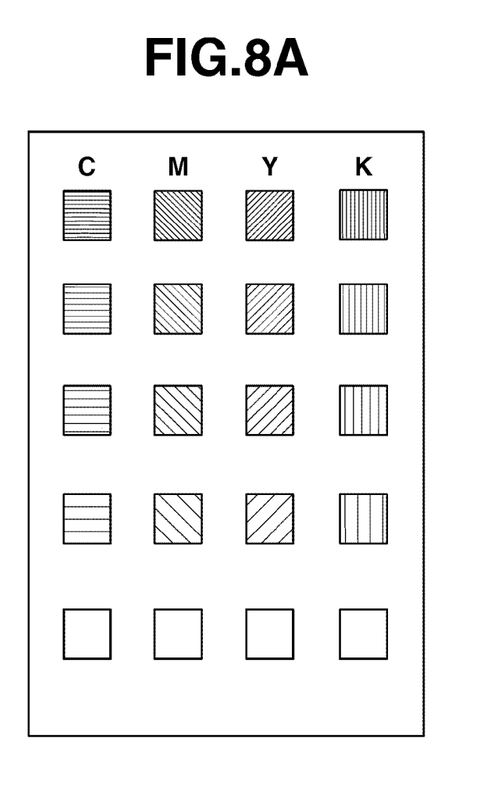
FIG. 8A is a diagram illustrating a pattern image output on a sheet of paper at the time of calibration.

In step S3001, the CPU 201 causes the printer 200 to print CMYK halftone image data of a gradation pattern stored in the ROM 202. Herein, a sheet is fed from a cassette storing plain paper therein, and the pattern is printed on this sheet. The sheet is then output. Since the printing procedure of the CMYK halftone image is described above, a description thereof is omitted. FIG. 8A illustrates an example pattern generated at this point. Solid density patches each having a halftone dot ratio of 100% are printed in the uppermost portion in the example pattern. The solid density patches in the uppermost portion have the maximum density of CMYK. The lower the position of patch, the lower the halftone dot ratio.

In a case where the ROM 202 has small storage capacity, a program for generating gradation pattern image data of CMYK continuous tone may be stored in the ROM 202. In such a case, the generated CMYK continuous tone gradation pattern is converted into a CMYK halftone image by the image processing unit 204. Herein, only the halftone processing unit 304 is operated to generate the CMYK halftone image, while the color processing unit 302 and the gamma correction processing unit 303 are not operated.

Figure 9A:
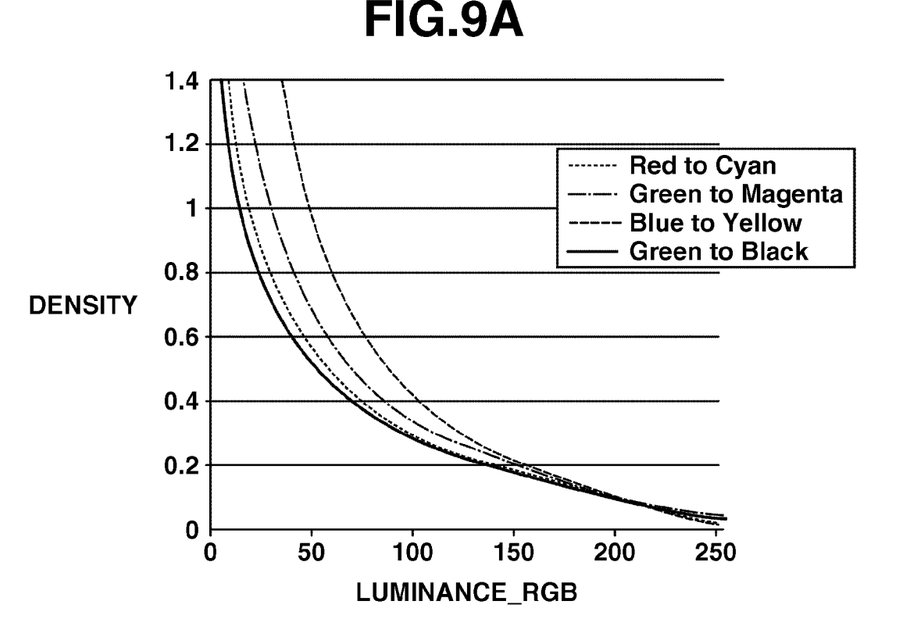
FIG. 9A illustrates an example of a conversion table for converting luminance of a reading device into density.

In step S3002, the reader unit 100 reads a printed document placed on the document positioning glass plate 102 by a user as a RGB image, and generates RGB continuous tone image data (multi-level data before conversion into halftone). Moreover, the CMYK density gradation data can be obtained from the RGB continuous tone image data. A one-dimensional LUT used at this point is stored in the device beforehand. FIG. 9A illustrates an example of the LUT.

For example, RGB luminance data in a cyan column illustrated in a printed pattern can be converted into density data of cyan by converting a luminance value of image data of red as a complementary color of cyan using the LUT illustrated in FIG. 9A. Since a similar conversion method can be applied to each of magenta, yellow, and black, the RGB luminance data of a printed document of a gradation pattern can be converted into density data of CMYK.

In step S3003, the CPU 201 generates a gamma correction table for plain paper by calculation based on obtained CMYK gradation data. The plain paper gamma correction table is an LUT used by the gamma correction processing unit 303 when a copy operation using plain paper is executed. An update of the gamma correction table can correct print density such that the print density remains the same even if a print environment by the printer 200 changes.

In step S3004, the CPU 201 obtains CMYK density data of solid patches in the CMYK gradation data obtained in step S3003.

Figure 8B:
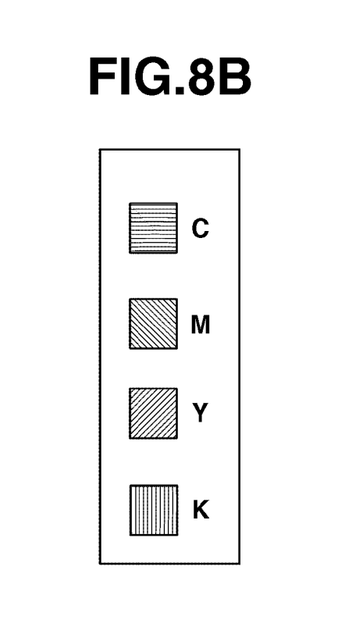
FIG. 8B is a diagram illustrating a pattern image formed on a transfer belt at the time of calibration.

In step S3005, the CPU 201 causes the CMYK halftone image data of the gradation pattern stored in the ROM 202 to be formed into a latent image and developed again to obtain a toner image, so that the resultant toner image is transferred to the transfer belt 111. Since the gradation pattern used at this point is only CMYK solid patch images, a pattern image as illustrated in FIG. 8B is used. Herein, the transferred image is not transferred to a sheet unlike a normal printing operation.

In step S3006, the CPU 201 measures each of the solid patches of CMYK images transferred to the transfer belt 111 as an image bearing member in step S3005 using a reflection sensor 127 in the device, and obtains a sensor value. Since the sensor values of the CMYK patches are analog values (voltage values), each of the sensor values is digitally converted by an analog-to-digital (A/D) converter (not illustrated) to obtain digital sensor values of the CMYK patches.

Figure 9B:
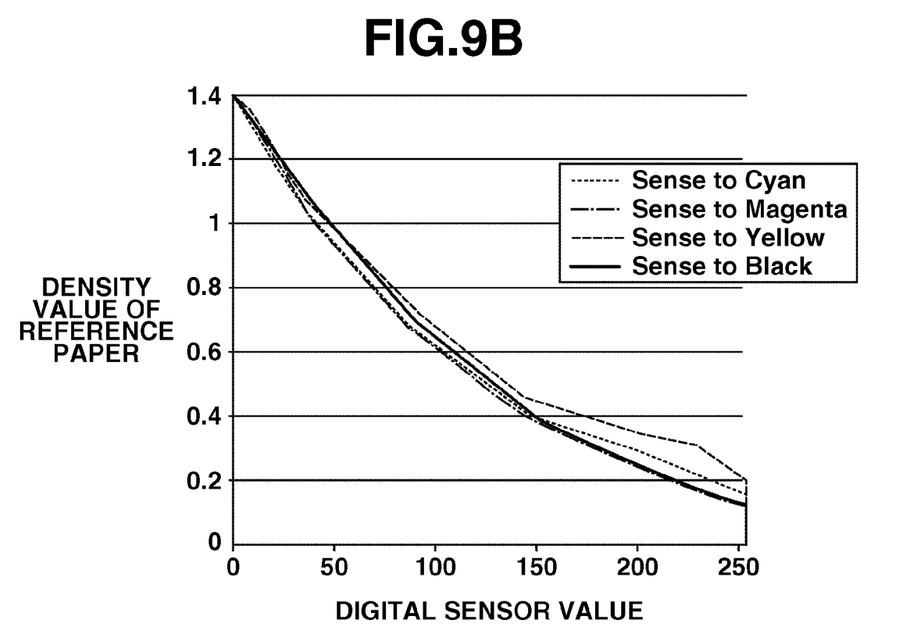
FIG. 9B illustrates an example of a conversion table for converting a digital sensor value into a reference paper density.

In step S3007, the CPU 201 converts the digital sensor values of the CMYK solid patches obtained in step S3006 into density values. Herein, the digital sensor value is converted into the density value at the time of fixing a toner image by the fixing device 114 upon transfer of the image to reference paper. Even if a density of the toner image formed on the transfer belt 111 is detected by the reflection sensor 127, a density of the toner image at the time of transfer to the paper changes depending on transferability. Thus, the density value at the time of fixing is needed. The sensor value is converted into the density value using the one-dimensional LUT according to a characteristic at the time of printing the toner image on the reference paper. Herein, the LUT is prepared beforehand, and an example of the characteristic is illustrated in FIG. 9B.

A difference between plain paper and reference paper is now described. A type of paper classified as "plain paper" represents printing paper which is generally distributed and has various characteristics depending on manufacturers. Thus, there is a variation in applicability and transferability of toner even in the same plain paper. On the other hand, the reference paper is defined in the present exemplary embodiment, as a reference by selecting one plain paper having a certain characteristic among a plurality of types of plain paper to generate a correlation between the plain paper and paper other than the plain paper. Normally, paper having a good characteristic (good transferability) among the plurality of types of plain paper is set as the reference paper beforehand. Therefore, when the reference paper is used, high-density printing can be performed relative to the use of the other plain paper.

In step S3008, the CPU 201 compares each CMYK density (A), obtained in step S3004, in a portion having the halftone dot ratio of 100%, which is the highest density in the pattern printed on the paper, with each CMYK density (B), obtained in step S3007, of the patch on the transfer belt 111 as an image bearing member. The CPU 201 obtains a difference which is (A −B)=ΔE for each CMYK as result of the comparison. In this case, each CMYK density (B) of the patch on the transfer belt 111 is not a value simply read by a sensor. A relationship between a value read by a sensor beforehand and a density to be measured at the time of printing a patch having this value on reference paper is set, and the CMYK density (B) of the patch on the transfer belt 111 is determined by referring to this relationship.

In step S3009, the CPU 201 compares the difference ΔE obtained in step S3008 with a first threshold. The first threshold is determined beforehand. If the difference ΔE is less than the first threshold (Yes in step S3009), a difference between the density of the solid patch printed on the plain paper used for this calibration and the density of the solid patch read from the transfer belt 111 can be small. Herein, since the density of the transfer belt 111 is a density converted using the value obtained when the patch is printed on the reference paper, a characteristic of the plain paper used for this calibration can be similar to that of the reference paper. Therefore, a correlation correction is not necessary, and the operation proceeds to step S3011. The correlation correction is described in detail below.

On the other hand, if the difference ΔE exceeds the first threshold (NO in step S3009), a characteristic of the plain paper used for this calibration differs significantly from that of the reference paper. Therefore, a correlation correction is necessary, and the operation proceeds to step S3010.

Herein, the CPU 201 stores the result obtained in step S3009 and the position of the cassettes 160, 170, or 180 having the plain paper used for this calibration as reference paper information in the RAM 203. In a normal operation, therefore, an LUT to be used by the gamma correction processing unit 303 can be selected for each plain paper cassette according to the reference paper information stored in the RAM 203.

Moreover, when calibration is executed based on the reference paper information, a cassette not provided with reference paper information or having old plain paper is preferentially selected as a cassette to be selected in step S3001. Such a selection updates the reference paper information, and appropriate paper and an appropriate look up table can always be used.

A correlation correction in step S3010 is described. In step S3010, the CPU 201 corrects a correlation.

The correlation indicates a correlation between a characteristic of reference paper and a characteristic of paper having a different type from the reference paper. The paper (non-reference paper) being different from the reference paper is classified as a different paper type from the reference paper. For example, the non-reference paper indicates thick paper and coated paper.

As described in the related art section, when a correlation between a characteristic of reference paper and a characteristic of non-reference paper and a gamma correction table obtained by calibration using the reference paper are used, a gamma correction table for thick paper or coated paper as non-reference paper can be obtained.

This correlation between the reference paper and the non-reference paper is stored beforehand in a device with respect to each characteristic of the non-reference paper.

Figure 10A:
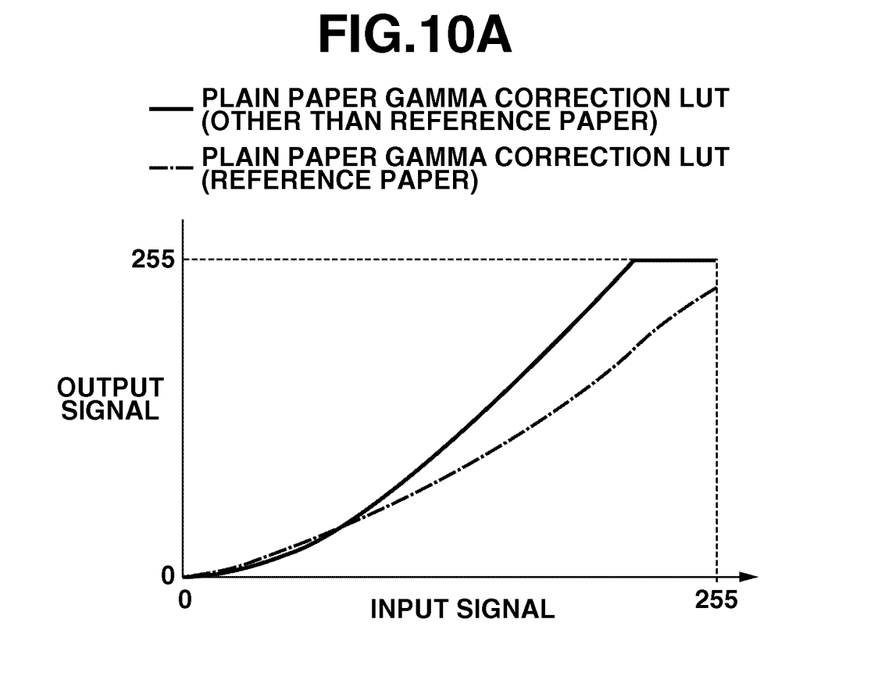
FIG. 10A illustrates an example of a gamma correction table for plain paper.
Figure 10B:
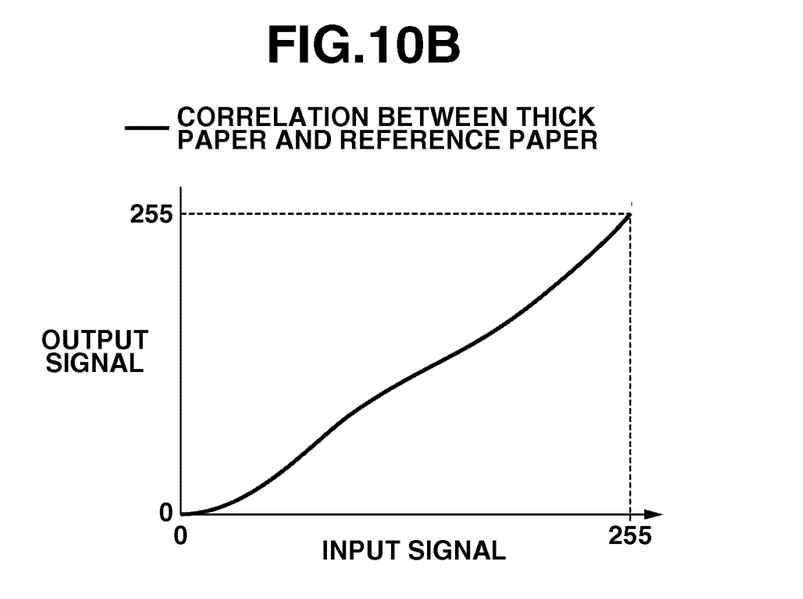
FIG. 10B illustrates an example of a correlation between reference paper and thick paper.

Generally, for example, the gamma correction table for the plain paper (generated in step S3003) (e.g., a characteristic illustrated in FIG. 10A) and the correlation between the reference paper and the thick paper (e.g., a characteristic illustrated in FIG. 10B) are combined to generate a gamma correction table for the thick paper.

However, if the difference ΔE exceeds the first threshold in step S3009, a characteristic of the plain paper used for this calibration is determined as being significantly different from that of the reference paper. Therefore, a correlation between reference paper and thick paper is corrected such that a certain gamma correction table for the thick paper is always obtained even if any plain paper having any characteristic is used at the time of calibration, the correlation being to be used after execution of this calibration.

A method for correcting the correlation between characteristics of the reference paper and the thick paper includes that a characteristic used for the correlation correction is prepared beforehand according to size of the difference ΔE.

Figure 10C:
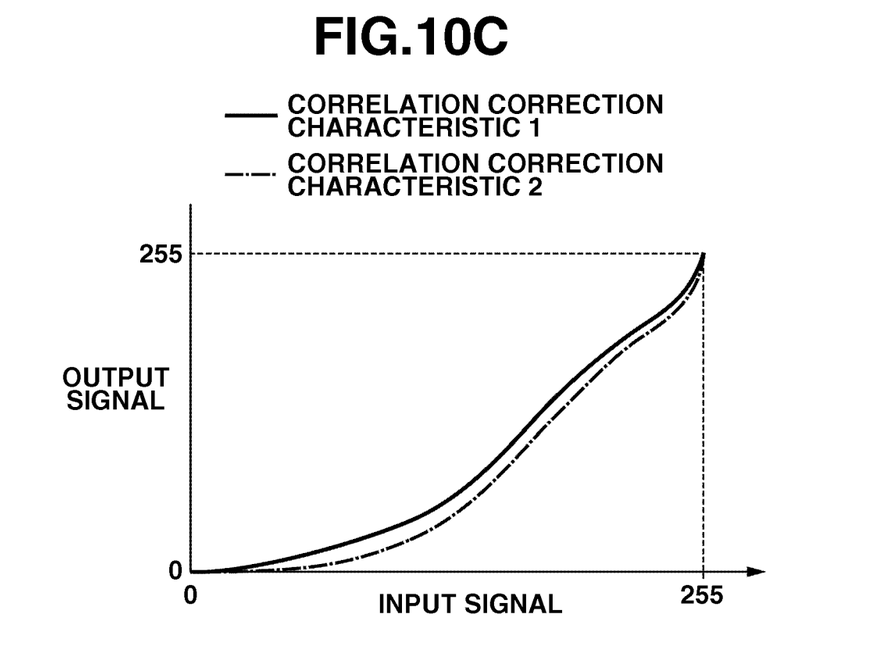
FIG. 10C illustrates an example of a correlation correction characteristic for correcting the correlation between the reference paper and the thick paper.

FIG. 10C illustrates two types of characteristics for correlation correction. These characteristics are prepared beforehand. A correlation correction characteristic 1 is used if a second threshold>ΔE. A correlation correction characteristic 2 is used if ΔE>the second threshold. The number of correlation correction characteristics to be prepared is not limited thereto, and may be changed according to specifications of the copying machine.

Moreover, a function can be used as a method for correcting a correlation correction characteristic. For example, a coefficient of a linear function or higher can be selected according to ΔE, and a correlation correction characteristic can be dynamically generated.

For example, the correlation correction characteristic 1 is combined with a correlation between characteristics of reference paper and thick paper, thereby obtaining a characteristic with a corrected correlation between the reference paper and the thick paper. Moreover, for example, assume that a third threshold which has a relationship of the third threshold>the second threshold is provided. If ΔE>the third threshold, calibration is performed using paper having a characteristic significantly different from that of reference paper. That is, the calibration is performed using plain paper having worse transferability than expected. Therefore, a result obtained by the calibration using the plain paper selected in such a situation should not be used for calibration on a type of paper other than the plain paper. Herein, it is recommended that the CPU 201 display a message on the operation unit 300, the message instructing a user to execute calibration with respect to a type of paper other than the plain paper.

In step S3011, the CPU 201 combines a correlation between the reference paper and the thick paper or a corrected correlation between the reference paper and the thick paper with a gamma correction table for the plain paper, thereby obtaining a gamma correction table for the thick paper. This gamma correction table for the thick paper can be used as appropriate gamma correction table even if plain paper used for calibration is reference paper or paper other than the reference paper.

Figure 10D:
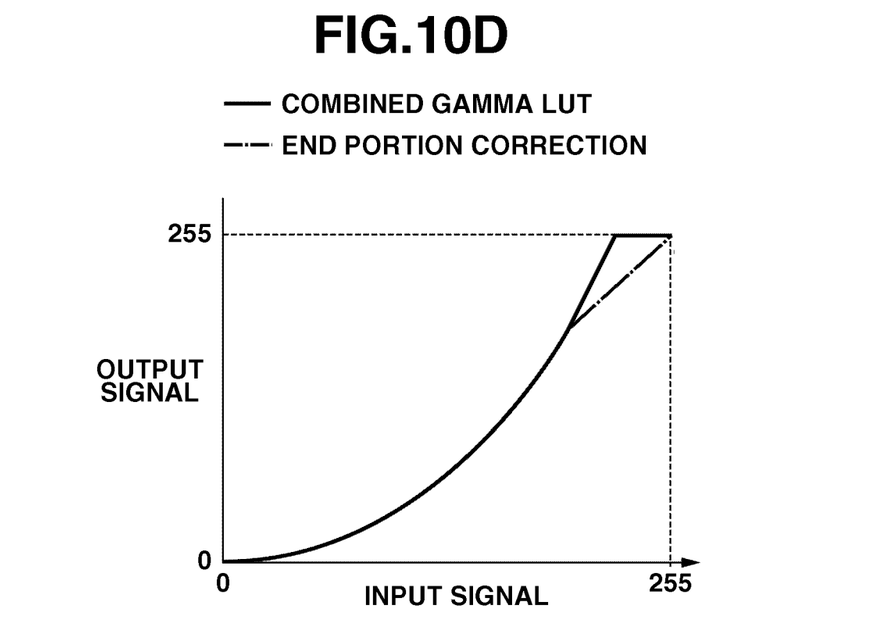
FIG. 10D illustrates an example of a correlation characteristic of corrected thick paper.

In step S3012, the CPU 201 corrects a characteristic of an end portion near the maximum density of the gamma correction table for the thick paper. In the plain paper gamma correction table (other than reference paper) illustrated in FIG. 10A, saturation (condensed density) occurs in a high-density portion. The saturation is a phenomenon occurring when a target density cannot be output at the time of calibration. If the corrected correlation between the reference paper and the thick paper is combined with the plain paper gamma correction table in this state, the correlation is also combined with the saturation portion, thereby causing an increase in density value to be higher than a desired value. Accordingly, the end portion needs to be corrected as illustrated in FIG. 10D. A correction method includes density reduction for forcedly reducing a density of the high-density portion by calculation such that saturation does not occur. However, the correction method is not limited thereto in the present exemplary embodiment.

The CPU 201 needs to execute steps S3010 through S3012 on each of all types of stackable paper. In the present exemplary embodiment, that is, the CPU 201 executes these steps on thick paper, coated paper, and OHP paper. Moreover, the CPU 201 needs to execute step S3004, and steps S3006 through S3012 on all of cyan, magenta, yellow, and black.

According to the present exemplary embodiment, even when a plurality of types of paper having different characteristics is classified as the same plain paper, and calibration is executed using plain paper other than reference paper, a gamma correction table to be used at the time of printing on paper classified as a type other than the plain paper can be appropriately corrected.

In a second exemplary embodiment of present invention, a description is given of an operation of a copying machine having no reflection sensor 127. Although the reflection sensor 127 is generally disposed to execute calibration without using a reader unit 100, there are many cases where the reflection sensors 127 is not disposed in a copying machine due to an increase in cost thereby.

In the second exemplary embodiment, differences between the first exemplary embodiment and the second exemplary embodiment are only described.

Figure 11:
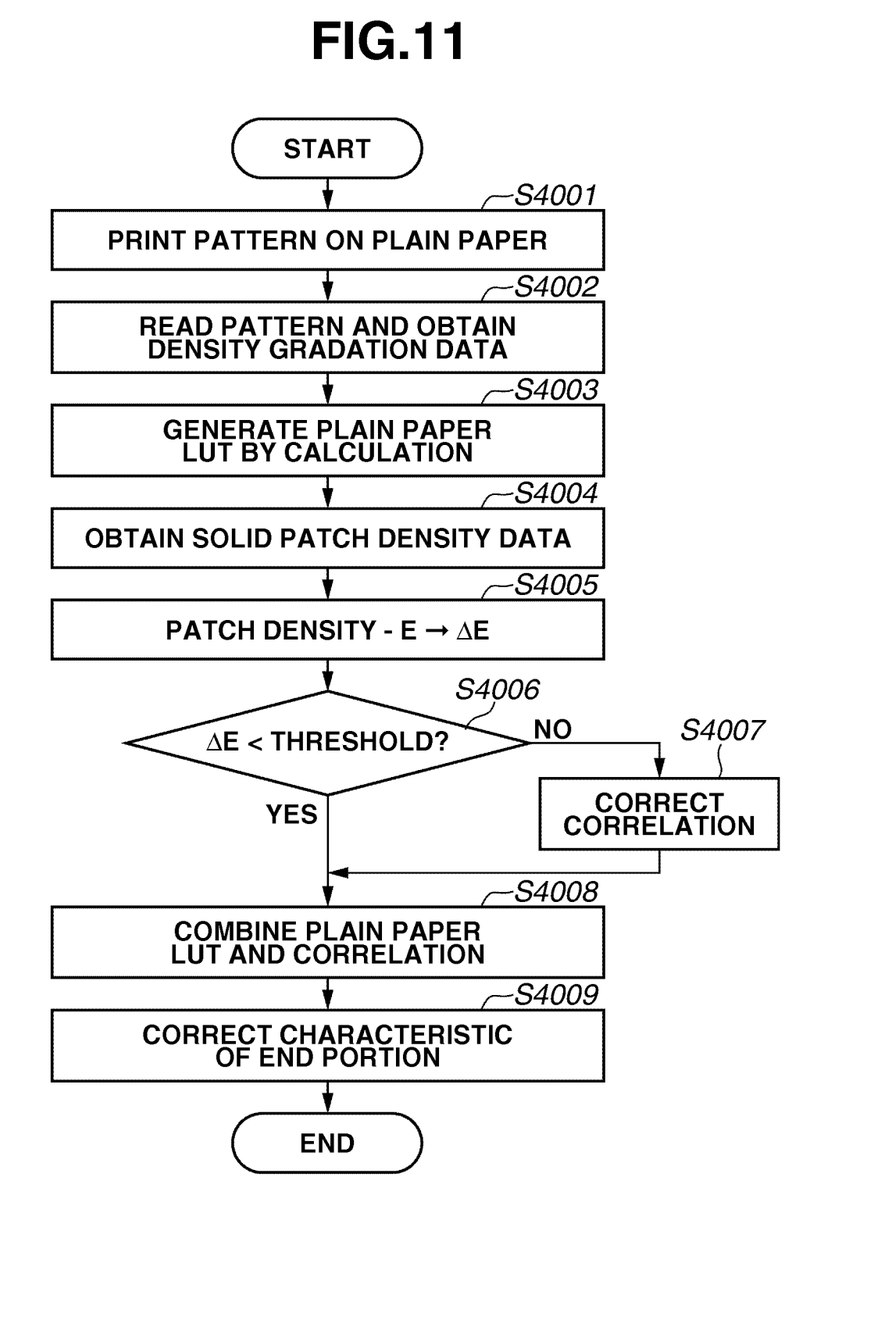
FIG. 11 is a flowchart illustrating processing at the time of execution of calibration according to a second exemplary embodiment of the present invention.

FIG. 11 is a flowchart illustrating processing according to the second exemplary embodiment. Since steps S4001 through S4004 correspond to steps S3001 through S3004 illustrated in FIG. 7, descriptions thereof are omitted.

In step S4005, the CPU 201 assigns a difference between a density of the solid patch obtained in step S4004 and a predetermined value E to ΔE, the solid patch being printed on the plain paper.

The predetermined value E is an expected density (e.g., 1.3) when a solid patch is printed on the reference paper. The predetermined value E is predicted or measured beforehand.

Since steps S4006 through S4009 correspond to steps S3009 through S3012 illustrated in FIG. 7, descriptions thereof are omitted.

According to the second exemplary embodiment, therefore, the following effect can be obtained even if the copying machine not employing the reflection sensor 127 is used. When a plurality of types of paper having different characteristics is classified as the same plain paper, and calibration is executed using plain paper other than reference paper, a density used at the time of printing on paper other than reference paper can be automatically and appropriately corrected.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-274887 filed Dec. 15, 2011, which is hereby incorporated by reference herein in its entirety.

What is claimed is:

1. An image processing apparatus comprising:
   an obtaining unit configured to obtain a gamma correction table to be used at the time of image formation on non-reference paper by using a correlation between a characteristic of reference paper and a characteristic of the non-reference paper and a gamma correction table obtained by executing calibration using the reference paper;
   a first reading unit configured to form a first pattern on plain paper and to read the formed first pattern on the plain paper;
   a second reading unit configured to form a second pattern on an image bearing member and to read the formed second pattern on the image bearing member;
   a comparison unit configured to compare a value read by the first reading unit with a value read by the second reading unit; and
   a correction unit configured to correct the correlation between a characteristic of the reference paper and a characteristic of the non-reference paper to be used at the time of obtaining the gamma correction table for the non-reference paper by the obtaining unit when a difference of the values compared by the comparison unit exceeds a first threshold.

2. The image processing apparatus according to claim 1, wherein, when the comparison unit compares the value read by the first reading unit with the value read by the second unit, the first reading unit reads a portion having a highest density in the first pattern formed on the plain paper.

3. The image processing apparatus according to claim 1, wherein a value provided by reading the second pattern formed on the image bearing member is stored beforehand.

4. The image processing apparatus according to claim 1, wherein, when a difference of the compared values exceeds a second threshold, an instruction for using the non-reference paper to execute calibration is displayed on an operation unit.

5. An image processing method comprising:
   obtaining a gamma correction table to be used at the time of image formation on non-reference paper by using a correlation between a characteristic of reference paper and a characteristic of the non-reference paper and a gamma correction table obtained by executing calibration using the reference paper;
   forming a first pattern on plain paper and reading the formed first pattern on the plain paper in a first reading step;
   forming a second pattern on an image bearing member and reading the formed second pattern on the image bearing member in a second reading step;
   comparing a value read in the first reading step with a value read in the second reading step; and
   correcting the correlation between a characteristic of the reference paper and a characteristic of the non-reference paper to be used at the time of obtaining the gamma correction table for the non-reference paper when a difference of the compared values exceeds a first threshold.

6. The image processing method according to claim 5, further comprising reading, when the value read in the first reading step with the value ready by the second reading step are compared, a portion having a highest density in the first pattern formed on the plain paper in the first reading step.

7. The image processing method according to claim 5, further comprising storing a value provided by reading the second pattern formed on the image bearing member beforehand.

8. The image processing method according to claim 5, further comprising, displaying on an operation unit, when a difference of the compared values exceeds a second threshold, an instruction for using the non-reference paper to execute calibration.

9. A non-transitory computer-readable storage medium storing a program that causes a computer to execute the image processing method according to claim 5.

* * * * *